United States Patent [19]

Heniser et al.

[11] 3,713,409
[45] Jan. 30, 1973

[54] APPARATUS AND METHOD FOR BONDING ADHESIVE SEAMS ON CAN BODIES

[75] Inventors: Eugene W. Heniser; James W. Jensen; Bernard K. Hook, all of Hastings, Mich.

[73] Assignee: Gulf & Western Industrial Products Company, Salem, Ohio

[22] Filed: Sept. 9, 1971

[21] Appl. No.: 179,108

[52] U.S. Cl. .................................. 113/12, 113/120 K
[51] Int. Cl. .................................................. B21d 51/26
[58] Field of Search ....... 113/120 K, 1 G, 7 A, 7 R, 8, 113/116 W, 12; 29/470.5, 470.6; 228/44; 156/202, 203, 217, 218

[56] References Cited

UNITED STATES PATENTS

| | | | |
|---|---|---|---|
| 2,773,465 | 12/1956 | Gedde | 113/8 |
| 2,458,008 | 1/1949 | Kruse | 113/8 |
| 3,014,445 | 12/1961 | Stuchbery et al. | 113/12 |
| 3,508,507 | 4/1970 | Austing | 113/12 |
| 3,348,510 | 10/1967 | Sillars | 113/7 R |

Primary Examiner—Charles W. Lanham
Assistant Examiner—Michael J. Keenan
Attorney—James H. Tilberry et al.

[57] ABSTRACT

Can bodies have side seams defined by overlapped side edges of a blank with adhesive interposed therebetween. The seam is bumped and held with variable force as can bodies are moved from station-to-station along a mandrel.

11 Claims, 5 Drawing Figures

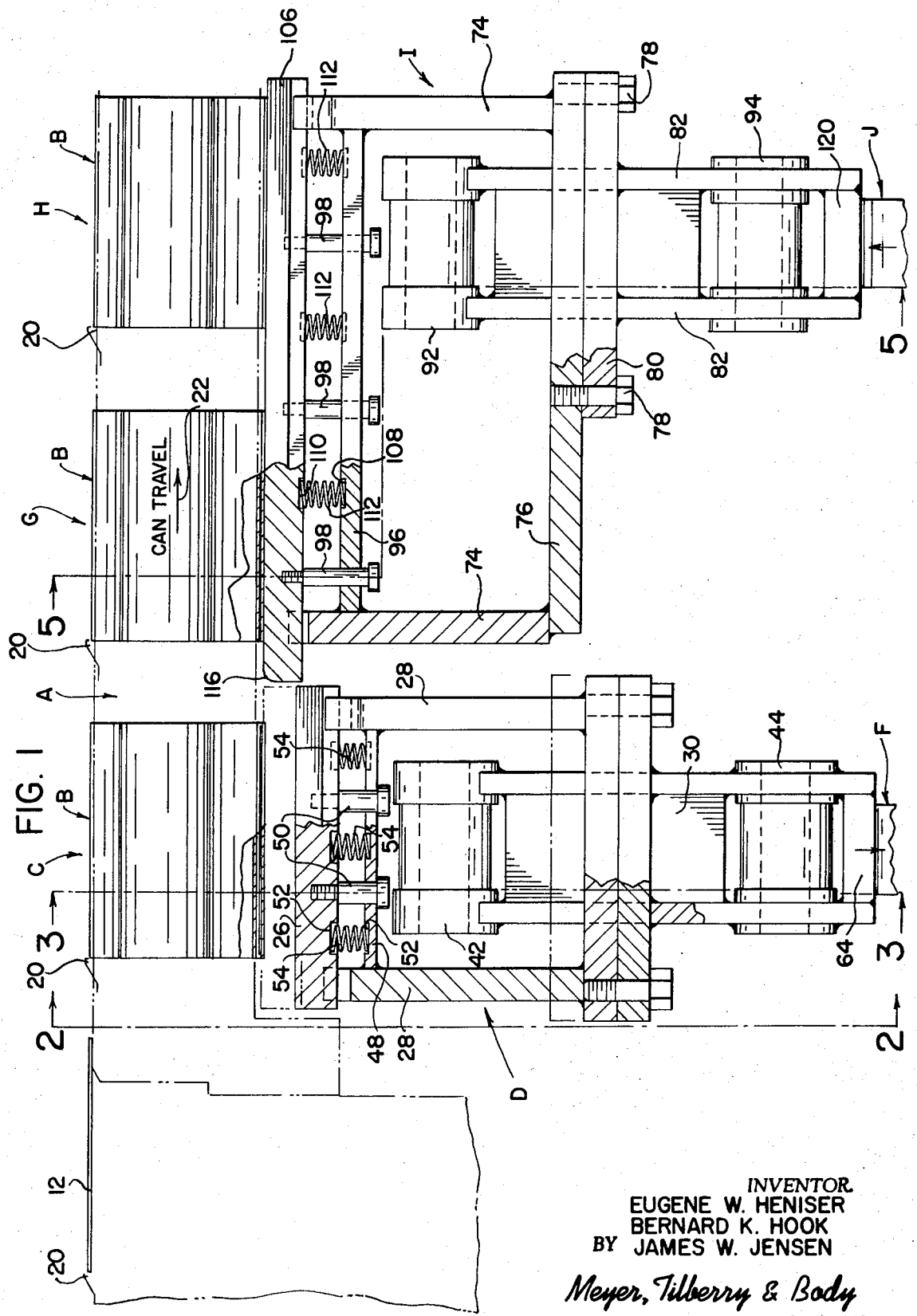

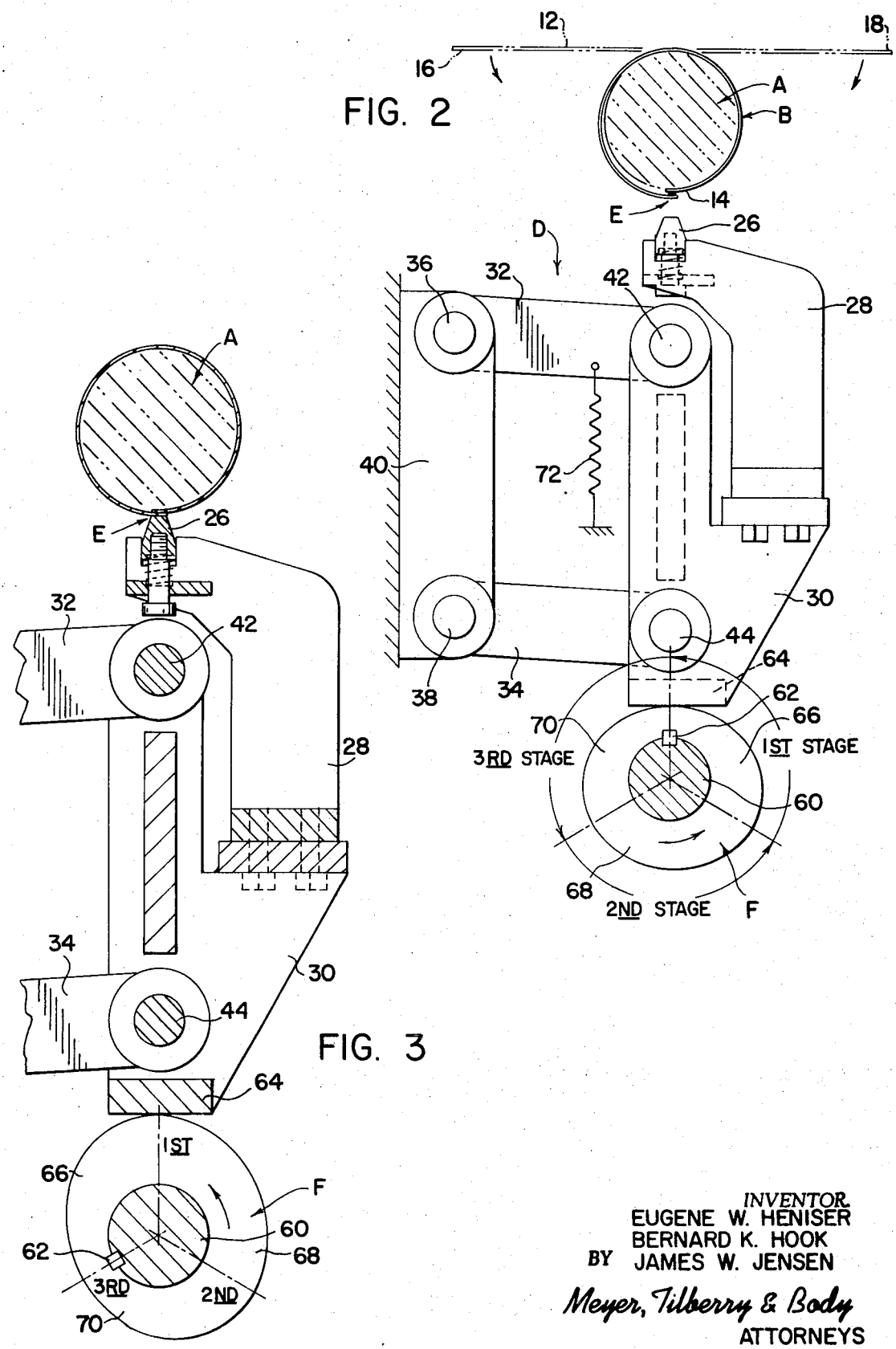

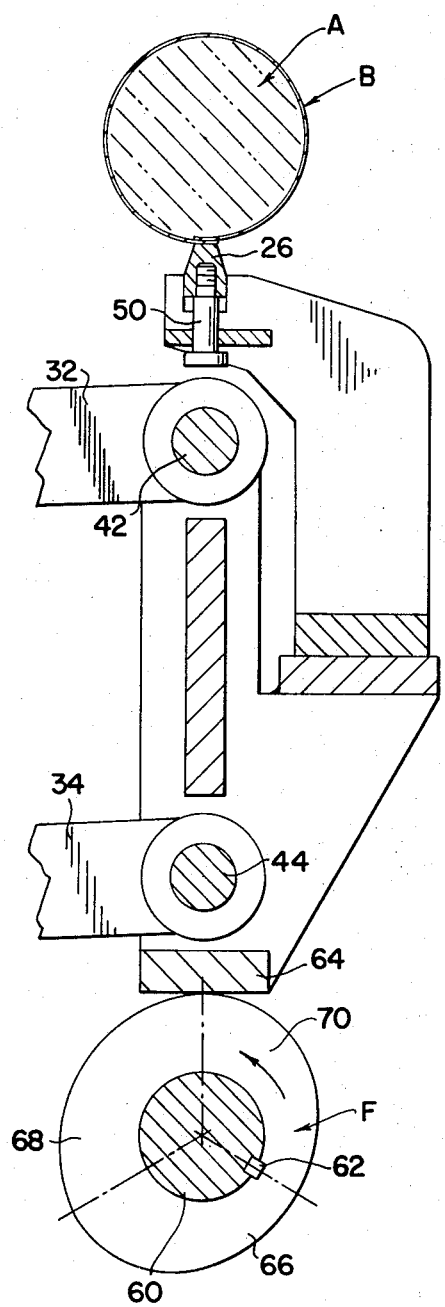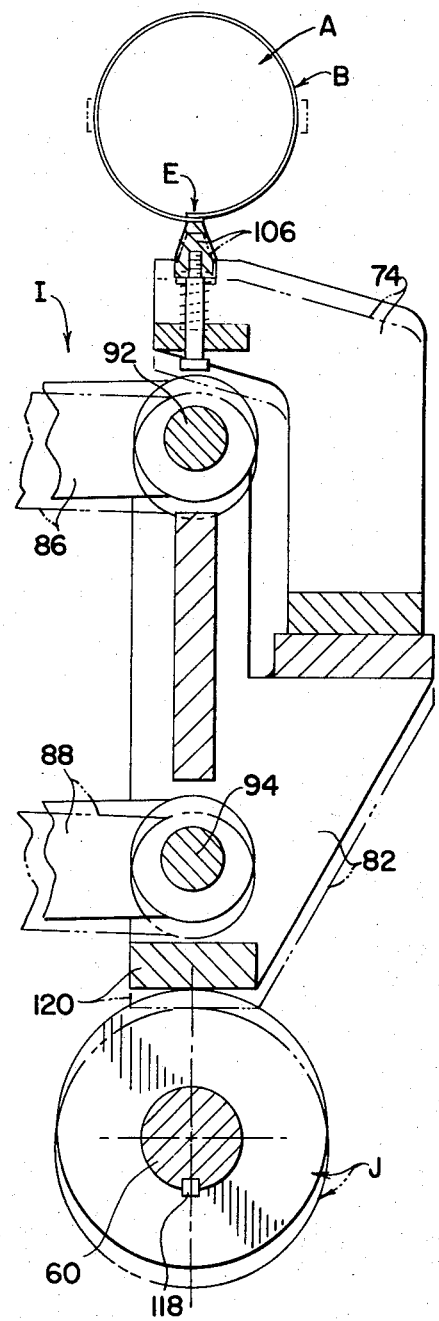

APPARATUS AND METHOD FOR BONDING ADHESIVE SEAMS ON CAN BODIES

BACKGROUND OF THE INVENTION

This application pertains to the art of forming seams and more particularly to bonding adhesive seams on can bodies. The invention is particularly applicable for use in bonding seams on cylindrical can bodies, although it will be appreciated that the invention has broader applications and may be used for bonding seams on other articles and other shapes.

Can bodies are conventionally formed by wrapping a flat rectangular blank around a forming horn with forming wings. The side edges of the blank are overlapped and have adhesive interposed therebetween for making a side seam on the can body. The seam is bumped and held momentarily by a hammer in order to set the adhesive. The can body is then moved along the forming mandrel to other stations. In previous apparatus of this type, it was possible that the seam would slip or shift before the adhesive had set. Holding the seam with the hammer at the first station for a sufficient length of time to insure complete setting of the adhesive considerably slows down the manufacturing process. It would be desirable to have an apparatus and method for insuring that the adhesive has set without requiring stoppage of the can body at one station for a long period of time while the seam is held by a hammer.

SUMMARY

In an apparatus and method of the type described, a movable hammer bumps and holds a seam with a predetermined first force at a first station position of a can body. The hammer engages the seam with a second force less than the first force during movement of the can body from the first station to a second station. A second hammer at the second station engages the seam with a first holding force as the can body moves from the first station to the second station. Once the can body is at the second station, a reciprocating feed device retracts to grab another can body. During retracting movement of the feed mechanism, the second hammer engages the seam with a second holding force greater than the first holding force.

In one arrangement, movable carriers are provided for carrying the hammers. Yieldable biasing means on the carriers normally biases the hammers away from the carriers toward the mandrel.

The present apparatus and method allows step-by-step movement of can bodies along an elongated mandrel while holding a side seam to prevent the seam from slipping or shifting. As the can body stops at each station, the seam is acted upon by a greater force than during movement of the can body.

It is a principal object of the present invention to provide an improved apparatus and method for making adhesively bonded side seams on can bodies.

It is another object of the present invention to provide an improved apparatus and method for holding and bonding a side seam on a can body during movement of the can body from station-to-station along a mandrel.

It is also an object of the present invention to provide an improved apparatus and method for making adhesively bonded seams on a can body while minimizing the stoppage time of a can body at each station and still preventing slippage or shifting of the seam.

BRIEF DESCRIPTION OF THE DRAWING

The invention may take form in certain parts and arrangements of parts, a preferred embodiment of which will be described in detail in this specification and illustrated in the accompanying drawing which forms a part hereof.

FIG. 1 is a side elevational view of the improved seam forming apparatus of the present invention and with portions in sections for clarity of illustration;

FIG. 2 is a cross-sectional elevational view looking generally in the direction of arrows 2—2 of FIG. 1;

FIG. 3 is a cross-sectional elevational view looking generally in the direction of arrows 3—3 of FIG. 1;

FIG. 4 is a cross-sectional elevational view looking in the same general direction as FIGS. 2 and 3, and showing the device in a later operating position; and FIG. 5 is a cross-sectional elevational view looking generally in the direction of arrows 5—5 of FIG. 1.

DESCRIPTION OF THE PREFERRED EMBODIMENT

Referring now to the drawings, wherein the showings are for purposes of illustrating a preferred embodiment of the invention only and not for purposes of limiting same, FIG. 1 shows an elongated mandrel A on which can bodies are formed and transferred from station-to-station during manufacture. Can bodies B are formed from flat rectangular blanks 12 having adhesive 14 applied to opposite overlapping side edge surfaces 16 and 18. Overlapped edge surfaces 16 and 18 having adhesive 14 interposed therebetween define a side seam for can body B. Forming wings wrap rectangular blank 12 around cylindrical mandrel A in a known manner at forming station C. It will be recognized that blank 12 may be formed into rectangular or other shapes and that the invention may be used to form seams in other hollow bodies such as conduits. Blanks 12, and can bodies B, are fed from station-to-station along elongated mandrel A by fingers 20 of a reciprocating feed mechanism for feeding can bodies B in the direction of arrow 22. Fingers 20 may be spring biased outwardly for engaging the end edges of can bodies B during feeding movement of the reciprocating mechanism in a known manner. Feed fingers 20 will then retract when reciprocating in a rearward direction for grabbing another blank or can body.

A first hammer carrier assembly D is positioned adjacent forming station C. Hammer carrier assembly D includes a hammer 26 for engaging seam E defined by overlapping side surface edges 16 and 18 of blank 12 having adhesive 14 interposed therebetween. A pair of spaced-apart arms 28 are bolted or otherwise suitably secured to mounting member 30. A pair of vertically spaced lever arms 32 and 34 are pivotally connected as at 36 and 38 with mounting bracket 40. Arms 32 and 34 are also pivotally connected as at 42 and 44 with mounting member 30. A plate 48 is welded in a substantially horizontal position to arms 28. Plate 48 has suitable holes therethrough for slidably receiving guide bolts 50 which are threaded into suitable threaded bores in hammer 26. Hammer 26 and plate 48 have a plurality of aligned facing recesses 52 formed therein for receiving end portions of coil springs 54. Coil springs 54 normally bias hammer 26 away from plate 48 and carrier assembly D toward mandrel A.

The apparatus includes a rotatably driven shaft 60 which is synchronized with the reciprocating feed mechanism having feed fingers 20 thereon. A three-stage cam E is keyed to shaft 60 as by key 62. The circumferential edge of cam F acts against cam follower plate 64 which is welded to mounting member 30. When the forming wings of the apparatus form blank 12 into a cylindrical shape around mandrel A at first station C, cam F is at its lowermost position so that hammer 26 is spaced downwardly out of contact with seam E. As the forming wings open, cam F continues to rotate so that its highest first stage 66 moves hammer carrier assembly D upwardly to the position shown in FIG. 3 so that hammer 26 bumps and holds seams E. Springs 54 are then under a predetermined high compression and force hammer 26 against seam E with a predetermined first force. Once the forming wings are completely opened, and another blank 12 is ready to be advanced to forming station C, fingers 20 are also ready to transfer a formed can body B from forming station C a second station G. As fingers 20 of the reciprocating mechanism approach a can body B at forming station C for moving can body B to second station G, cam E has rotated to a lower position of its second stage 68 to relieve some of the compression in springs 54 so that hammer 26 is held against seam E with less force than the first bumping and holding force. While seam E is held with this second holding force, the reciprocating mechanism having fingers 20 shifts a can blank B from forming station C along mandrel A to second station G. Seam E is under a bonding force when it is transferred from first station C to second station G. Once a can body B has been transferred to second station G, cam F has rotated to its third stage position 70 so that hammer 26 is once again out of contact with mandrel A and another rectangular blank 12 can be formed into a cylindrical can body. If desired, a spring 72 may be provided for positively moving hammer carrier assembly D downwardly so that cam follower 64 constantly rides on cam F.

Mounted adjacent second station G, and third station H, is a second hammer carrier assembly I. Second hammer carrier assembly I includes a pair of spaced-apart arms 74 welded to a substantially horizontal plate 76 which is bolted, as by bolt 78, to plate 80 welded on mounting member 82. Second hammer carrier assembly I has a pair of parallel vertically spaced lever arms 86 and 88 which are pivotally connected to a mounting bracket in the same manner as arms 32 and 34 of hammer carrier assembly D. Arms 86 and 88 are also pivotally connected to mounting member 82 as at 92 and 94. A horizontal plate 96 welded to arm 74 has a plurality of holes therethrough slideably receiving guide bolts 98 which are threaded into suitable threaded bores formed in second hammer member 106. Plate 96 and hammer 106 have a plurality of aligned recesses 108 and 110 receiving end portion of coil springs 112. Springs 112 normally bias hammer 106 away from plate 96 and second carrier assembly I toward mandrel A. Hammer 106 has a curved or cammed upper front edge 116 so that can bodies B transferred from first station C to second station G will not catch on the forward edge of second hammer 106.

A second program means defined by cam J is mounted on shaft 60 as by key 118. Cam J is a two-stage cam which acts against cam follower 120 welded on mounting member 82. Cam J urges second carrier assembly I toward mandrel A so that hammer 106 always engages seam E. In a first stage of cam J, springs 112 are compressed to hold hammer 106 against seam E with a predetermined first holding force. This predetermined first holding force is applied to seam E of can body B during transfer of can body B from first station C to second station G. Once can body B reaches second station G, and fingers 20 of the reciprocating mechanism begin rearward movement to grab another can body, cam J moves to its second stage so that springs 112 are further compressed and hammer 106 is held against seam E with a second holding force substantially greater than the first holding force. When can body B is ready for transfer to a third station H, cam J again moves to its first stage wherein hammer 106 is held against seam E with less force during movement of the can bodies.

It will be recognized that the arrangement of the present invention provides for a maximum holding force against the seam when the can bodies are stopped at successive stations in their step-by-step movement along mandrel A. A lesser force is applied to the seam during step-by-step movement of can bodies B from station-to-station. This arrangement prevents shifting or slipping of the seam during transfer of can bodies B along mandrel A. The arrangement shown includes a holding force applied to the seam at three successive stations. However, it will be recognized that it is possible to provide more or less stations at which the seam is positively held simply by increasing or decreasing the length of hammer 106. Second hammer carrier assembly I may also have a spring for biasing it downward to positively hold cam follower 120 in engagement with cam J at all times.

While the invention has been described with reference to a preferred embodiment, it is obvious that equivalent alterations and modifications will occur to others skilled in the art upon the reading and understanding of this specification. The present invention includes all such equivalent alterations and modifications and is limited only by the scope of the claims.

Having thus described our invention, we claim:

1. In an apparatus for making hollow bodies from flat blanks having side edges, said blanks being formed into hollow bodies around an elongated mandrel with said side edges overlapping one another and having adhesive interposed therebetween to define a side seam, said apparatus including reciprocating feed means for feeding said bodies from station-to-station in a feed direction along said mandrel, the improvement comprising; first hammer means movable toward and away from said mandrel for engaging said side seam, first program means for moving said first hammer means into engagement with said seam at a predetermined first force at a first station position of said body, said first program means holding said first hammer means in engagement with said seam at a second force less than said first force during movement of said body from said first station to a second station by said feed means.

2. The device of claim 1 and further including movable first carrier means for carrying said first hammer means, and yieldable biasing means on said carrier for normally biasing said first hammer means away from said first carrier means toward said mandrel.

3. The device of claim 2 wherein said first program means comprises rotatable first cam means for engaging said first carrier means.

4. The device of claim 1 and further including second hammer means movable toward and away from said mandrel for engaging said side seam at a second station of said bodies, said second hammer means being positioned adjacent said first hammer means in said feed direction of said bodies, second program means for holding said second hammer means in engagement with said seam at a predetermined first holding force during forward feeding movement of said feed means, said second program means holding said second hammer means in engagement with said seam at a second holding force greater than said first holding force during retracting movement of said feed means.

5. The device of claim 4 and further including movable second carrier means for carrying said second hammer means, and yieldable biasing means on said carrier for normally biasing said second hammer means away from said second carrier means toward said mandrel.

6. The device of claim 5 wherein said second program means comprises rotatable second cam means for engaging said second carrier means.

7. The device of claim 4 and further including movable first and second carrier means for carrying said first and second hammer means, and yieldable biasing means on said carrier means for normally biasing said hammer means away from said carrier means toward said mandrel.

8. The device of claim 7 wherein said first and second program means comprise rotatable cam means for engaging said first and second carrier means.

9. A method of bonding side seams defined by overlapped side edges and hollow bodies having adhesive interposed therebetween as said bodies are moved along an elongated mandrel from station-to-station by feed means, comprising the steps of; applying a first force to said seams at a first station, applying a second force less than said first force to said seams as said bodies are moved from said first station to a second station.

10. The method of claim 9 and further including the step of applying a first holding force to said seams as said bodies are moved to said second station, and applying a second holding force greater than said first holding force to said seams at said second station of said bodies.

11. The method of claim 10 wherein said forces are yieldable biasing forces.

* * * * *